United States Patent
Piccirillo et al.

[11] Patent Number: 5,920,951
[45] Date of Patent: Jul. 13, 1999

[54] PARAMETER SENSING SOOTBLOWER

[75] Inventors: David P. Piccirillo, Carroll; Thomas E. Moskal, Pickerington; John T. Huston, Sugar Grove; Ryan M. Tooill, Rushville, all of Ohio

[73] Assignee: Diamond Power International, Inc., New Orleans, La.

[21] Appl. No.: 08/832,309

[22] Filed: Apr. 3, 1997

Related U.S. Application Data

[51] Int. Cl.$^6$ ....................................... B08B 3/02
[52] U.S. Cl. ...................... 15/318.1; 15/319; 122/390
[58] Field of Search ................... 15/316.1, 317, 15/318, 318.1, 319; 122/379, 380, 390

[56] References Cited

U.S. PATENT DOCUMENTS

| | | |
|---|---|---|
| 1,476,809 | 12/1923 | Gebhardt . |
| 2,441,112 | 5/1948 | Hibner et al. . |
| 2,640,217 | 6/1953 | Howse . |
| 2,696,631 | 12/1954 | Hibner, Jr. . |
| 2,883,694 | 4/1959 | Hibner, Jr. et al. . |
| 2,897,532 | 8/1959 | Cantieri . |
| 3,439,376 | 4/1969 | Nelson et al. . |
| 3,794,051 | 2/1974 | Lee et al. ........................ 15/317 X |
| 4,207,648 | 6/1980 | Sullivan et al. . |
| 4,387,481 | 6/1983 | Zalewski . |
| 4,399,773 | 8/1983 | Schwade et al. . |
| 4,492,187 | 1/1985 | Hammond et al. ............. 15/316.1 X |
| 4,498,213 | 2/1985 | Zalewski . |
| 4,803,959 | 2/1989 | Sherrick et al. . |
| 5,181,482 | 1/1993 | Labbe et al. . |
| 5,437,295 | 8/1995 | Brown et al. .................. 15/318.1 X |

*Primary Examiner*—Chris K. Moore
*Attorney, Agent, or Firm*—Harness, Dickey & Pierce, PLC

[57] ABSTRACT

A PLC based parameter sensing sootblower having a retractable lance tube that is extended and retracted by a drive motor. A PLC sensing circuit is used to sense when the lance tube is fully extended and/or fully retracted. The PLC sensing circuit can be configured to sense drive motor current, power, torque or other drive motor characteristics to determine when the lance tube has come to a hard stop upon extension. The PLC sensing circuit then calculates an approximate time window in which the lance should be fully retracted. The parameter sensor is configured to sense the drive motor current, power, torque or other characteristic only during the time window to determine when the lance tube is fully retracted while ignoring any motor load variations outside of the designated time window.

23 Claims, 7 Drawing Sheets

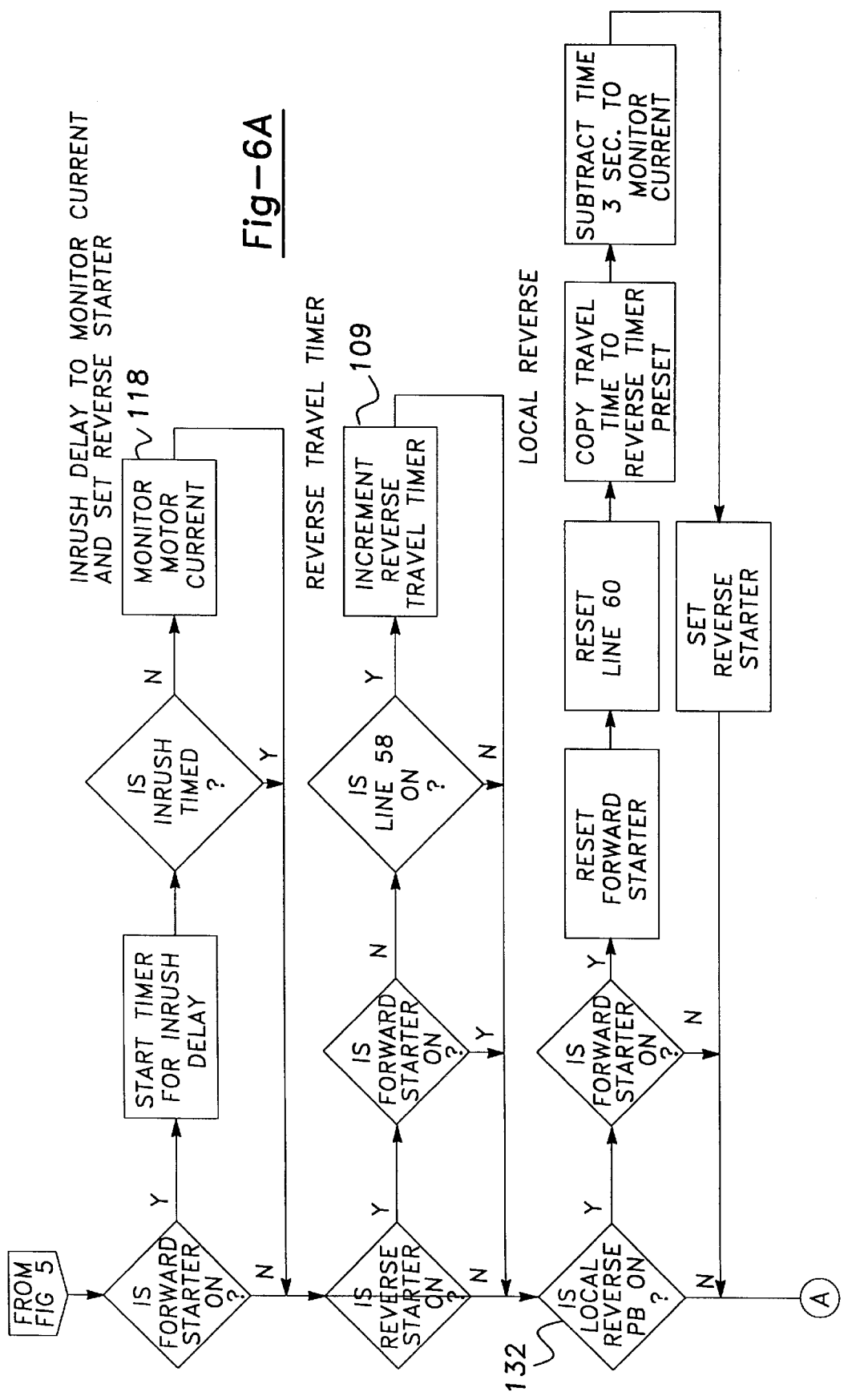

PARAMETER SENSING SOOTBLOWER

BACKGROUND OF THE INVENTION

1. Field of the Invention

The present invention relates generally to sootblower devices which are used to project a stream of fluid cleaning medium against internal surfaces of large scale combustion devices for cleaning the internal surfaces. More particularly, the present invention concerns a control system for such devices.

2. Background Information

Sootblowers are used to project a stream of a fluid cleaning medium such as water, air or steam against internal heat transfer surfaces of a combustion device such as a large scale boiler. The fluid cleaning medium is used to dislodge various combustion by-products, including slag and ash, which become deposited on the heat transfer surfaces. The cleaning medium dislodges the encrustations through thermal and mechanical shock which fractures the encrustations, breaking them free and dislodging them from the heat transfer surfaces. If the encrustations are not removed, boiler efficiency significantly decreases. However, through effective and consistent sootblowing, the efficiency of the boiler can be maintained.

Various types of sootblowers are presently used. One general category of sootblowers is known as the long retracting type. These devices have a retractable lance tube which is periodically advanced into and withdrawn from the combustion device, and may be simultaneously rotated such that one or more nozzles on the lance tube project a jet of cleaning medium which traces a desired cleaning path.

In typical retracting sootblowers, a feed tube is held stationary relative to the sootblower frame which sets outside the combustion device. One end of the feed tube is supplied with the cleaning medium through a poppet valve. The lance tube slidably over-fits the feed tube and its longitudinal sliding and rotational motion is controlled by a transmission gear set contained in a carriage which moves along tracks on the sootblower frame.

The cleaning medium supplied to the feed tube pressurizes the hollow interior of the lance tube. The cleaning medium escapes from the lance tube through one or more nozzles which direct the spray against the surfaces to be cleaned. At the conclusion of the cleaning cycle, the lance tube is retracted and withdrawn from the combustion device to avoid continued exposure to the intense heat and/or corrosive atmosphere inside the boiler which would degrade or destroy the lance tube.

Typically, limit switches are used to determine when the lance tube is fully extended and/or fully retracted. The limit switches are placed at strategic locations along the sootblower frame and are actuated by the carriage moving past them. One limit switch is used to determine when the lance tube is fully extended and signals the drive motor controller to reverse the carriage drive direction so as to retract the lance tube. Another limit switch determines when the lance tube is fully retracted and signals the drive motor controller to turn off the motor at the conclusion of a cleaning cycle.

One concern with the above-described sootblower design is that the limit switches are expensive and often cause maintenance problems, particularly in high temperature and highly corrosive applications such as recovery boilers. Thus, there is a need for a relatively inexpensive and easily maintained sensing and control mechanism for determining when a sootblower lance tube is fully extended and/or fully retracted. Another problem with the above-described sootblower design is that sootblowers in general, and limit switches in particular, require a substantial amount of additional wiring and circuitry for implementation and control. Thus, there is also a need for a means for reducing the amount of additional wiring and circuitry needed to implement and control a sootblower.

Although other types of position sensors could conceivably be used, such as light interrupter or variable reluctance transducers, their use may be limited by the severe operating environment of a sootblower, and can impose cost burdens.

SUMMARY OF THE INVENTION

The present invention provides a sensing circuit configured for sensing when the lance tube of a sootblower is fully extended and/or fully retracted. The sensing circuit preferably implements a Programmable Logic Controller or "brick PLC" which interfaces with the drive motor. In one embodiment, the sensing circuit uses a current sensing relay to monitor the drive motor current to detect when the carriage has hit the end of the track (hard stop) causing the motor to stall and causing a spike in current, thus indicating that the lance tube is fully extended or fully retracted.

In certain situations, when the lance tube is retracting from the boiler, it may be possible that a motor overload or stall condition would appear, based on current flow, to be incorrectly interpreted as a hard stop and the lance tube could be stopped inside the boiler. In order to compensate for such motor overload or stall conditions, the circuit is configured to record the forward travel time of the lance tube to the point of reversal such that the sensing circuit knows an approximate window of time when the hard stop for the retraction will be reached. The sensing circuit then only monitors the motor current during this window of time, thus ignoring any of the above mentioned overload or stall conditions that would otherwise falsely indicate that the end of the track had been reached. While a current sensor is mentioned above, it is also possible to use a power, torque or other such sensor to sense the carriage hitting the hard stops.

The system also may be implemented to avoid the necessity of reaching hard stops during each cycle of operation. In one cycle, the time needed for the carriage to travel between stops is recorded. In subsequent cycles, the motor can be operated for a time intended to cause the carriage to move just short of full travel. Periodically, the system can be caused to make hard-stops, or will migrate to that condition to recalibrate or reinitialize the system. In this way, the wear, noise and stress caused by hard stops can be reduced.

Further objects, features and advantages of the invention will become apparent from a consideration of the following description and the appended claims when taken in connection with the accompanying drawings.

DETAILED DESCRIPTION OF THE PREFERRED EMBODIMENT

Preferred embodiments of the parameter sensing sootblower of the present invention are described below with reference to the drawings.

Figure 1:
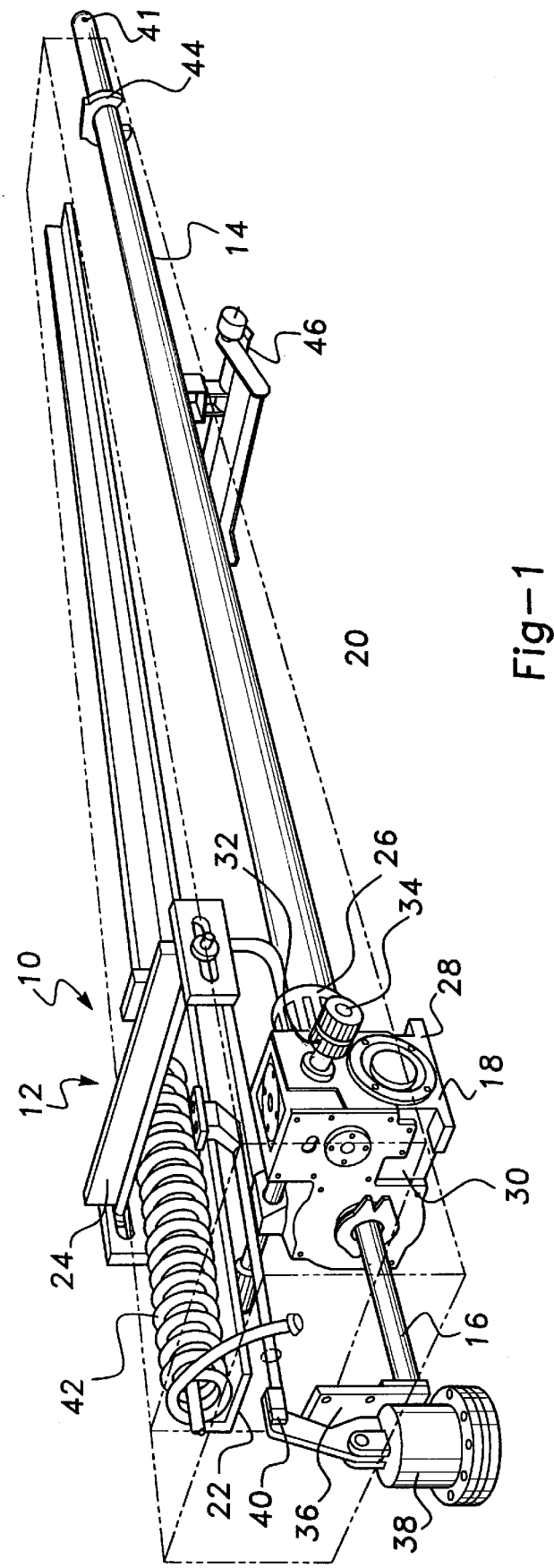
FIG. 1 is a pictorial view of a long retracting sootblower which is one type of sootblower which may incorporate the novel features of the present invention.
Figure 2:
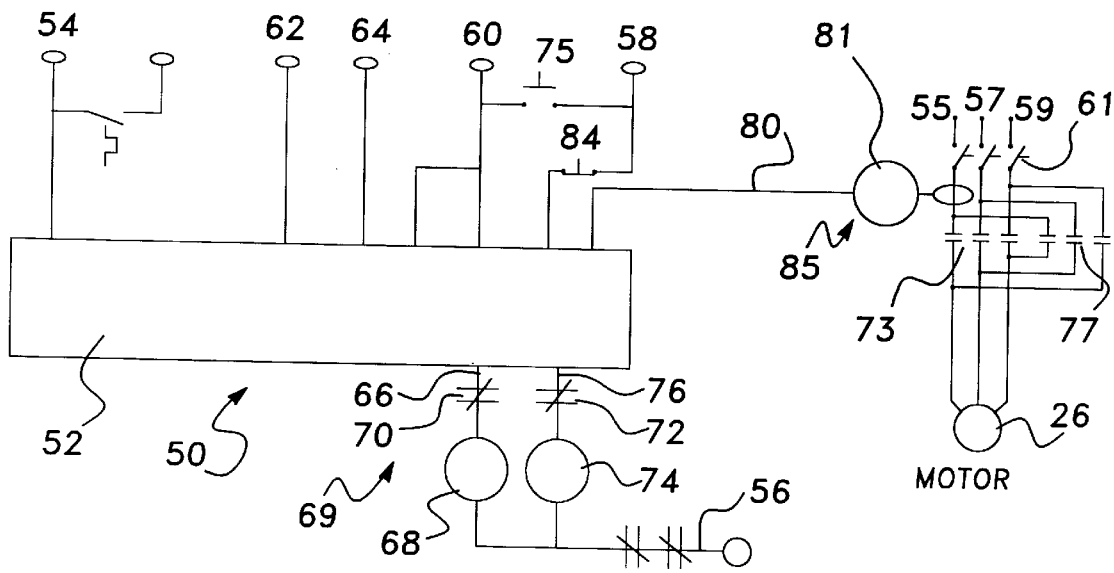
FIG. 2 is a schematic circuit diagram of an embodiment of a parameter sensing sootblower made in accordance with the teachings of the present invention.

Referring now to FIG. 1, a sootblower, generally designated at 10, principally comprises a frame assembly 12, a lance tube 14, a feed tube 16, and a carriage assembly 18. Sootblower 10 is shown in its normal retracted resting position. Upon actuation, lance tube 14 is extended into and retracted from a combustion device and may be simultaneously rotated.

Frame assembly 12 includes a generally rectangularly shaped frame box 20 which forms a housing for the entire unit. Carriage assembly 18 is guided along two pairs of tracks located on opposite sides of frame box 20, including a pair of lower tracks (not shown) and upper tracks 22, only one of which is shown for clarity. A pair of toothed racks (not shown) are rigidly connected to upper tracks 22 and are provided to enable longitudinal movement of carriage assembly 18. Frame assembly 12 is supported by a wall box (not shown) which is affixed to the combustion device wall or another mounting structure and is further supported by support bracket 24.

Carriage assembly 18 drives lance tube 14 into and out of the combustion device and includes drive motor 26 and gear box 28 which are enclosed by housing 30. Drive motor 26 in the preferred embodiment is a three phase motor allowing for driving rotation in either direction. Carriage assembly 18 drives a pair of pinion gears 32 which engage the toothed racks to advance the carriage 18 and lance tube 14. Support rollers 34 engage the guide tracks to support carriage assembly 18.

Feed tube 16 is attached at one end to rear bracket 36 and conducts the flow of fluid cleaning medium which is controlled through the action of poppet valve 38. Poppet valve 38 is actuated through linkages 40 which are engaged by carriage assembly 18 to begin cleaning medium discharge upon extension of lance tube 14, and cuts off the flow once the lance tube 14 and carriage assembly 18 return to their idle retracted position, as shown in FIG. 1. Lance tube 14 over-fits feed tube 16 and a fluid seal between them is provided by a joint packing (not shown). The team or water sootblowing medium flows through the hollow interior of lance tube 14 and exits through one or more nozzles 41 located at the end of the lance tube 14.

Coiled electrical cable 42 conducts power to the drive motor 26. Front support bracket 44, having rollers, supports lance tube 14 during its longitudinal and rotational motion. For long lance tube lengths, an intermediate support 46 may be provided to prevent excessive bending deflection of the lance tube 14. Additional details of the construction of the well-know design of "IK" types of sootblowers manufactured by assignee can be found with reference to commonly held U.S. Pat. Nos. 3,439,376 and 4,803,959, which are hereby incorporated by reference.

Now with reference to FIGS. 2 through 7, novel aspects of the present invention are shown in detail. In order to control the extension and retraction of the lance tube 14, the present invention provides a Programmable Logic Controller (PLC)-based parameter sensor 50, the preferred embodiment of which is illustrated schematically in FIG. 2.

The parameter sensor 50 is configured to control operation of drive motor 26 and monitor drive motor operating parameters. The heart of the parameter sensor 50 is a Programmable Logic Controller (PLC) 52. A PLC 52 is a commercially available intelligent controller typically used for controlling motor circuits in industrial applications. The preferred embodiment uses an AB Micrologix 1000™ PLC, manufactured by The Allen Bradley, Co., Milwaukee, Wis.; however any similar PLC or programmable computing device may be used.

The PLC 52 includes ladder logic which is programmed for accomplishing the drive motor control. The ladder logic program logic can be loaded at system assembly time and can be customized for various control scheme variations. By using ladder logic to store the program logic, engineering and manufacturing hours can be reduced since custom wiring and assembly is not required. As mentioned above, the invention is not limited to a PLC or ladder logic but may be implemented using any computing device programmed in any language to perform similar logic.

Operation of the motor 26 is controlled by the PLC 52 through a motor starter circuit 69. The motor starter circuit 69 comprises a forward relay coil 68 and an associated reverse contact 70 and a reverse relay coil 74 and an associated forward contact 72. The forward coil 68 is energized to make the drive motor 26 extend the lance tube 14 by closing the associated forward contacts 73 of forward relay coil 68. The forward coil 68 is de-energized thus opening the forward contacts 73 and the reverse coil 74 is energized to reverse the drive motor 26 and retract the lance tube 14 by closing the associated reverse contacts 77 of reverse relay coil 74. Two of the three phase power conductors 55, 57, and 59 are reversed by de-energizing forward relay coil 68 and energizing reverse relay coil 74 thereby causing the motor 26 to change directions.

A current sensor 85 is provided for sensing the drive motor current and providing a drive motor status signal to the PLC 52. The current sensor 85 can be configured to monitor one, two, or all three phases of the current supplied to the drive motor 26. In the preferred embodiment, the current sensor 85 comprises a current sensing relay 81 configured to close a contact to the PLC 52 when the drive motor current reaches a predetermined setpoint. In an alternative embodiment, the current sensor 85 supplies an analog current signal to the PLC 52 and the PLC adder logic establishes the predetermined setpoint and monitors the analog current signal.

The PLC 52 monitors a plurality of input lines and controls the drive motor 26 by sending output signals to the drive motor 26 on a plurality of outputs lines. Line 54 provides 120 VAC control power. Line 56 is a common or neutral line relative to line 54. Line 58 is a 120 VAC line that is momentarily interrupted to retract the sootblower lance tube 14. Line 60 is a 120 VAC remote start signal that allows a control panel to start the sootblower operation. Line 62 is a 120 VAC signal that indicates when the sootblower lance tube 14 is being retracted from the combustion device. Line 64 is used to indicate that the lance tube is away from the rest position and is operating. Line 66 drives the forward relay coil 68 and reverse contact 70 on a reversing starter. Line 76 drives the reverse relay coil 74 and forward contact 72.

The operation of the present invention is illustrated in FIGS. 3 through 7. In operation, while the lance tube 14 is in the rest position, the PLC 52 is continually monitoring line 60 for a start signal, shown in FIG. 5 as step 100. The start signal can come from a remote control panel or a local start push button 75 shown in FIG. 2. Once line 60 is sensed as on, the PLC 52 looks for input line 58 to be on as shown as step 102, indicating control power is present. If control power is present, then the PLC 52 looks to see if the forward relay coil 68 is already energized, shown as step 104. If it is not energized, then the PLC 52 energizes the forward relay coil 68 as shown as step 106, and starts the forward travel timer, shown as step 108. Once the forward relay coil 68 is energized, the sootblower 10 should start operation by extending the lance tube 14 into the combustion device and timing the forward travel time $T_2$, shown as step 109.

Figure 3:
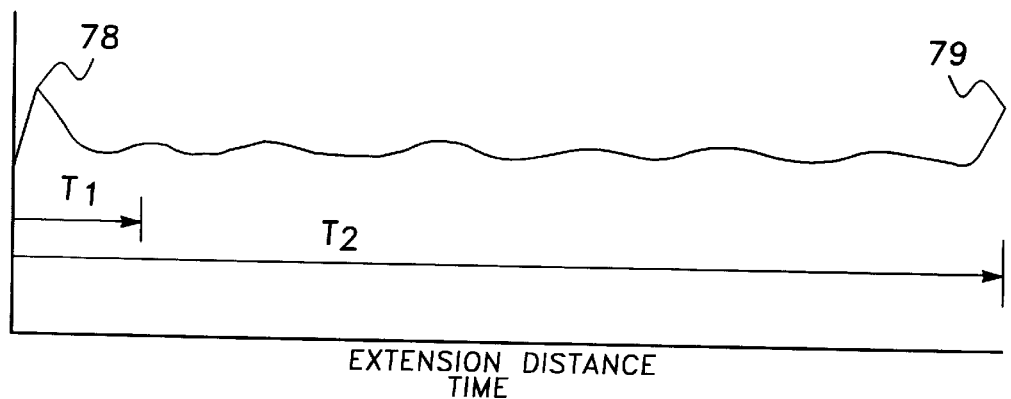
FIG. 3 is a timing diagram indicating timing windows and electrical motor current during the lance tube forward travel into a combustion device.
Figure 4:
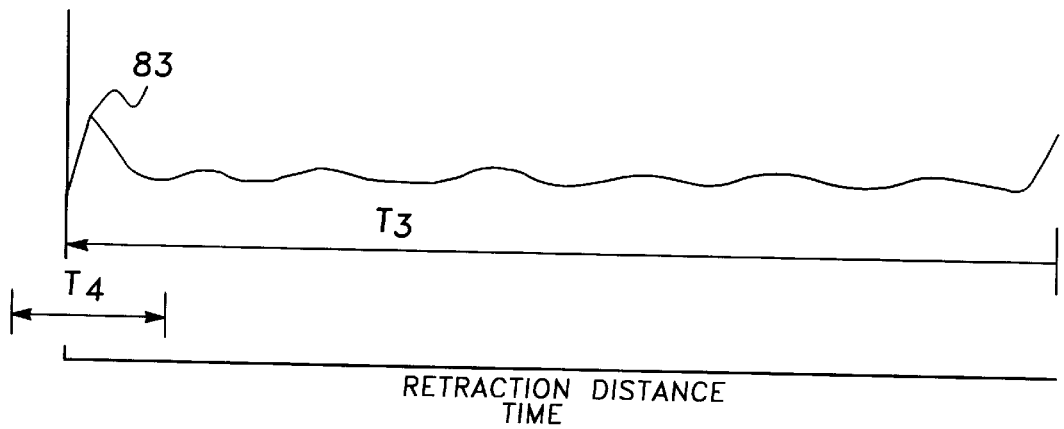
FIG. 4 is a timing diagram indicating timing windows and electrical motor current during the lance tube reverse travel out of a combustion device.
Figure 5:
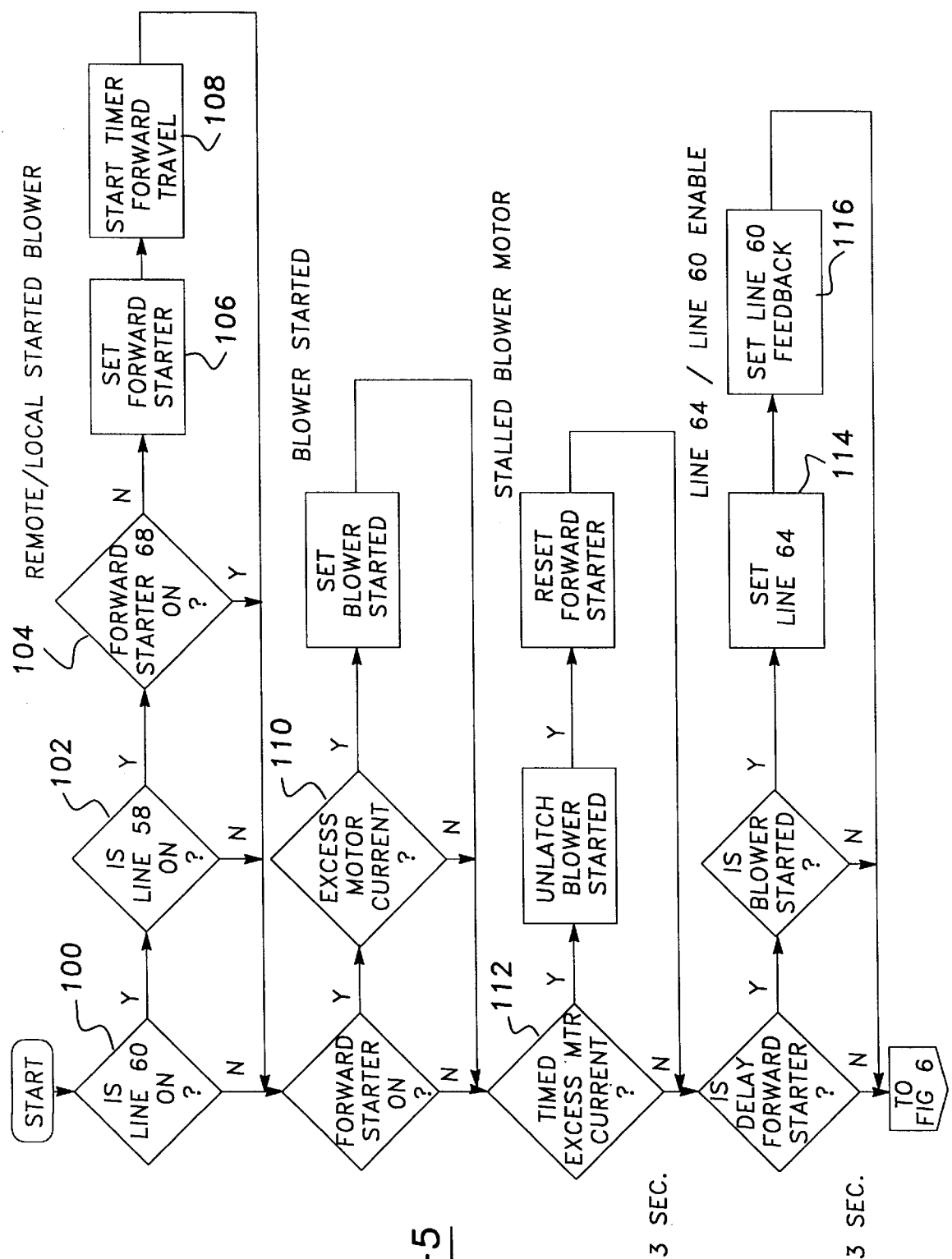
FIGS. 5 through 7 are flow chart diagrams indicating the operational flow of the preferred embodiment of the present invention.
Figure 6B:
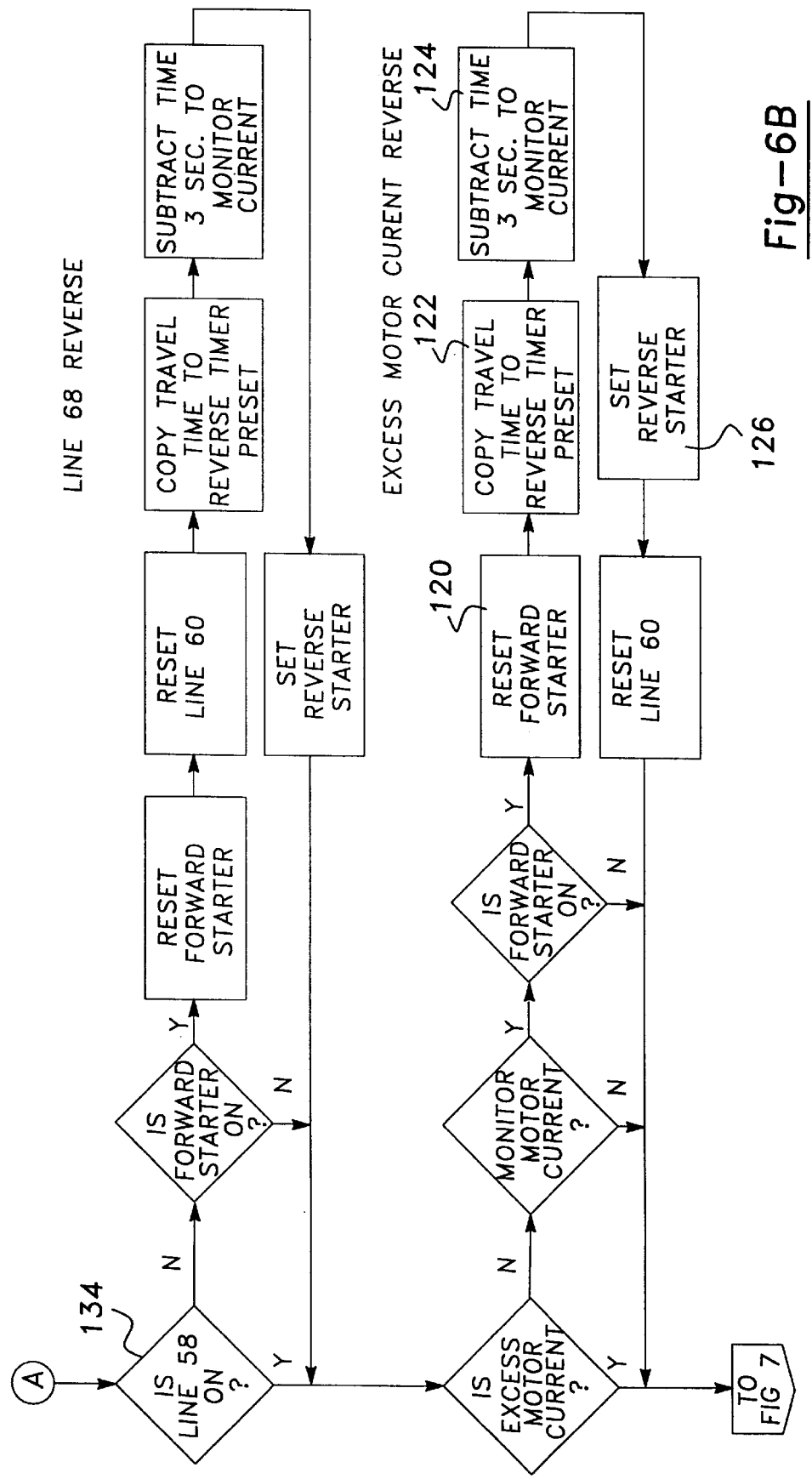
Figure 7:
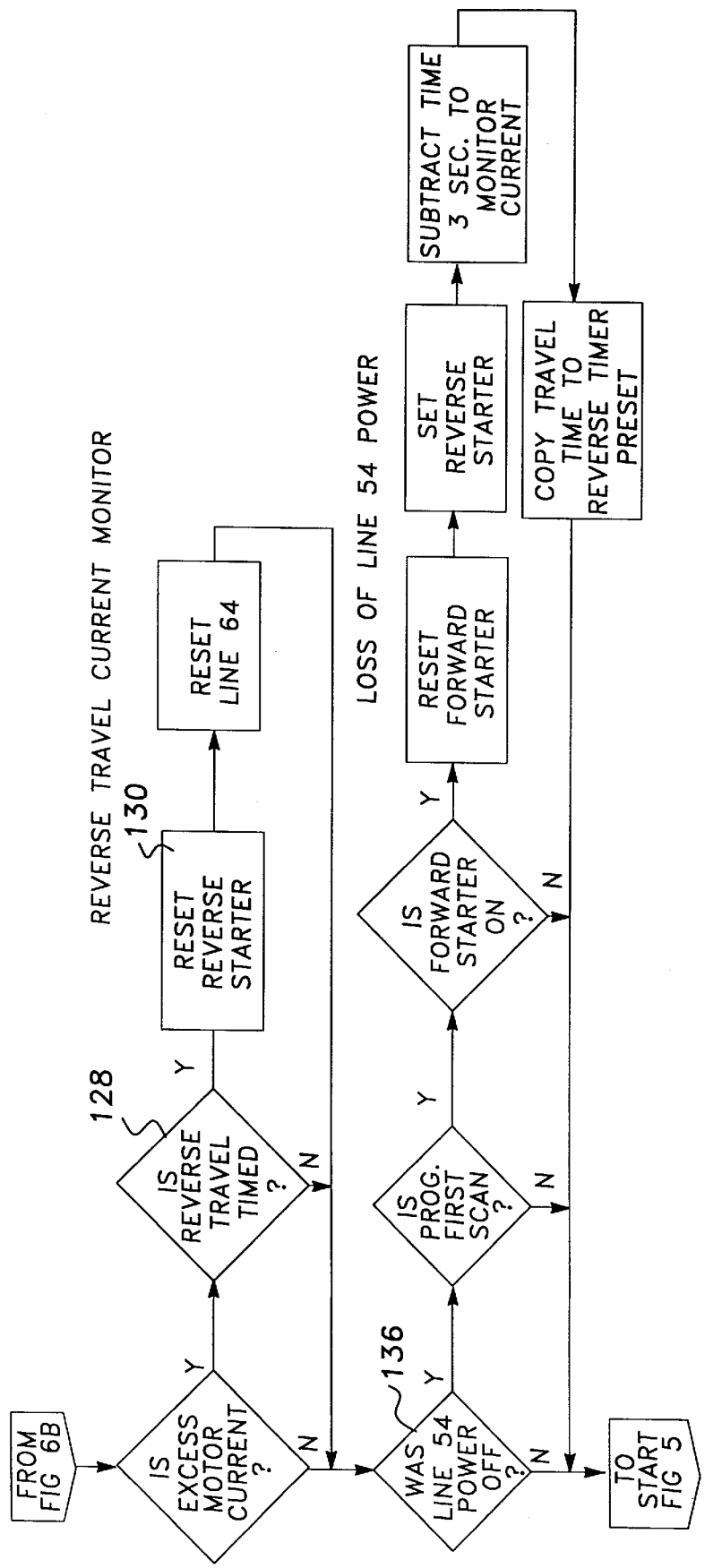

To confirm that the sootblower 10 has actually started, the PLC 52 looks for a high peak in rush current typical of when a motor starts, shown as step 110. FIG. 3 shows the drive motor current as the lance tube 14 is extended into the combustion device. The peak in rush current is shown at point 78 in FIG. 3. In order to sense peak 78 the PLC 52 monitors input line 80 supplied by current sensing relay 81. As shown in FIG. 3, peak 78 should fall within a 2–3 second time period $T_1$ from the time the motor 26 is commanded to start. If the PLC 52 does not sense the peak 78, line 64 is not turned on. If the PLC 52 does sense peak 78 within a few seconds, line 64 is turned on indicating to the panel that lance tube 14 is away from the rest position and the sootblower 10 has successfully started.

In the event that the motor 26 is stalled, the current sensing relay 81 will latch and stay latched. Therefore, once the motor 26 is commanded to start and line 80 sensed, the current sensing relay 81 must unlatch within a few seconds as shown as step 118 or the motor 26 is determined to be stalled and line 64 is not turned on, indicating the motor 26 did not start. If the sootblower 10 successfully starts, line 64 and line 60 are both turned on, shown as steps 114 and 116, respectfully, indicating to the panel that the sootblower 10 has started. The PLC 52 then monitors line 80 from the current sensing relay 81, shown as step 118, until the lance tube 14 reaches a fully extended position, at which time it hits a hard stop. The current will increase very quickly, as shown as peak 79 in FIG. 3, and the current sensing relay 81 will operate in less than ¼ second. The motor 26 is then shut off, as shown as step 120, the forward travel time $T_2$ is recorded, shown as step 122, and the sootblower 10 will be reversed, shown as step 126, to retract the lance tube 14 from the combustion device. This very quick sensing of the stalled motor condition prevents physical damage to the sootblower 10.

After the sootblower 10 has reversed, the reverse timer travel $T_3$ is set for the amount of time during the forward travel, less a few seconds for error, shown as step 124 (3 seconds in the preferred embodiment). The signal on line 80 from the current sensing relay 81 is ignored during the reverse travel time, shown as step 128. This avoids any nuisance inputs which would cause the PLC 52 to sense that the lance tube 14 has hit the rear hard stop. A reverse stop window $T_4$ is calculated and once the reverse travel time reaches the reverse stop window $T_4$ the PLC 52 again begins to monitor line 80. Once the PLC 52 senses the rapid current increase associated with current sensing relay 81 energizing, due to the lance tube 14 hitting a hard stop, as shown by point 83 in FIG. 4, the PLC 52 stops the sootblower 10, shown as step 130. During the forward travel of the lance tube 14, the PLC 52 also monitors the input from a local reverse push button 84 and line 58 for a reverse signal before the lance tube 14 reaches the hard stop, shown as steps 132 and 134, respectfully. Furthermore, the PLC 52 monitors line 54 for control power, shown as step 136, during the entire operation.

The preferred embodiment describes a current sensing PLC-based parameter sensor, however, it is contemplated that the PLC-based parameter sensor 50 can be configured to sense other drive motor 26 parameters, such as power or torque, which also indicate important drive motor characteristics. A power sensor would operate essentially the same as the above described current sensor 85, sensing drive motor power instead of drive motor current. A torque sensor could be mounted on the motor shaft or motor mount and be configured to generate a contact closure to the PLC 52 when a torque setpoint is exceeded. The torque sensor could also be configured to provide an analog torque signal to the PLC 52, similar to the current sensor 85 described above. Furthermore, a reverse limit switch could be used instead of using the PLC 52 to control the lance tube 14 retraction while still utilizing the drive motor parameter sensing to indicate the completion of the retraction cycle.

Parameter sensor 50 can also be implemented in a manner which avoids the requirement of having the carriage assembly 18 reach a hard stop at both the extended and retracted positions. The repeated requirement of hitting a hard stop can lead to wear and deterioration of the system. PLC 52 can be programmed such that once a hard stop condition is achieved at both the extended and retracted positions, the time elapsed between those occurrences can be recorded. In subsequent operating cycles, PLC 52 can operate drive motor 26 in both the extension and retracted directions for a time duration slightly less than that required for the carriage assembly 18 to reach its fully extended or retracted position. If the travel between full extension and the operating cycle is small, the sootblower may in practical terms reach its full range of positions even while a hard stop condition has not been achieved. Since drive motor 26 are typically of a synchronous variety, the distance of movement of carriage assembly 18 is in a highly repeatable manner correlated with its activation time. However, over time, drift, wear and other factors can influence the extent of travel over a given time duration. Therefore, it may be desirable to, on a regular basis, after a predetermined number of cycles allow carriage assembly 18 to fully reach a hard stopped condition as a means of reinitializing or recalibrating the actuation time. Another approach would be to gradually increase the time of travel from one successive operation to the next until the next hard stop condition is reached.

Figure 8:
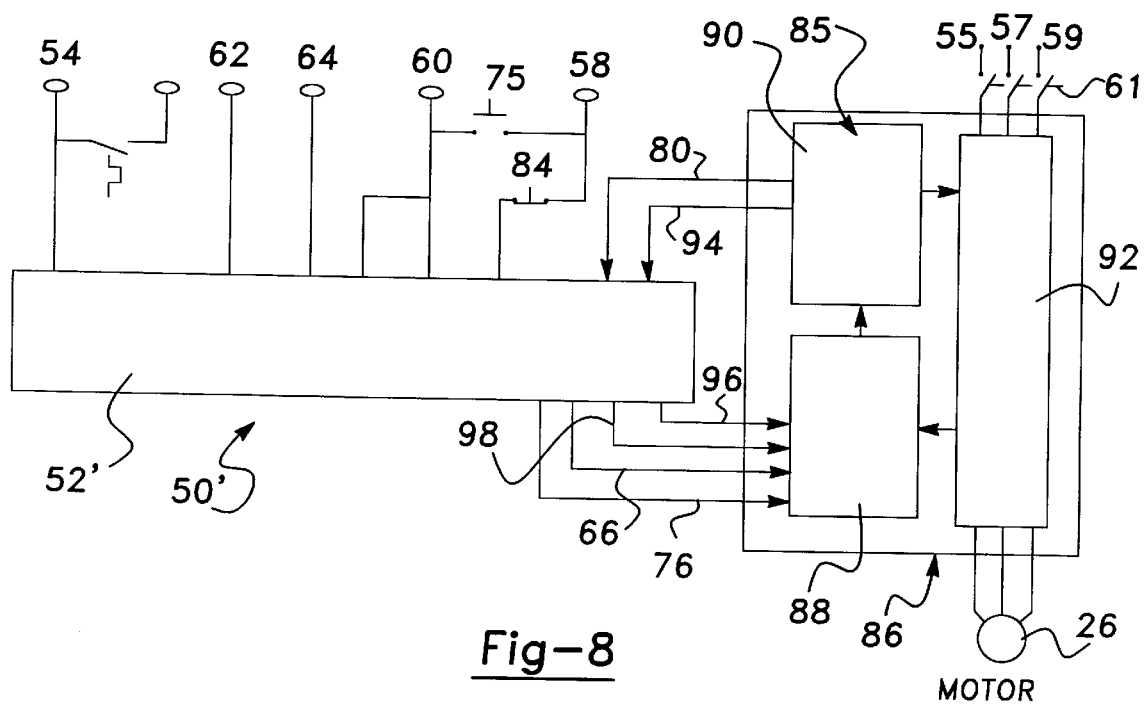
FIG. 8 is a schematic circuit diagram of an alternate embodiment of a parameter sensing sootblower made in accordance with the teachings of the present invention.

An alternate embodiment of the parameter sensor 50' is schematically shown in FIG. 8. The present embodiment differs from the previously described embodiment in that a solid state motor starter board 86 is utilized. As shown, the present embodiment of sensor 50' preferably includes PLC 52' having ladder logic program logic as previously described. A portion of the program logic is also contained on a blower starting and reversing logic segment 88 of board 86 but would operate equally well as part of the PLC 52'. Since a portion of the program logic is contained on logic segment 88 of board 86 enable input line 94, enable output line 96, and disable output line 98 are shown to provide communication between board 86 and PLC 52'. The flow chart diagrams of FIGS. 5–7 generally represent the logic utilized in the present embodiment and need not be described in detail again.

As shown, current sensor 85 is a solid state motor current sensing circuit 90 which is in electrical communication with PLC 52' through line 80. Line 80 is monitored by PLC 52' in order to sense current peaks such as 78, 79, and 83. Also included on board 86 is a solid state switch segment 92 which controls the flow of current to the three phase motor 26. Switch segment 92 acts in conjunction with the three phase power conductors 55, 57, and 59 to control the direction of rotation of motor 26, and therefore the direction of movement of sootblower 10, as described in the previous embodiment.

It is to be understood that the invention is not limited to the exact construction illustrated and described above, but that various changes and modifications may be made without departing from the spirit and scope of the invention as defined in the following claims.

We claim:

1. A parameter sensing circuit for a sootblower having a retractable lance tube wherein said lance tube is carried by a carriage assembly into and out of a combustion device, the carriage assembly being driven by a drive motor, the sensing circuit comprising:

means for sensing a drive motor electrical operating parameter; and motor control means for controlling the drive motor during movement of the lance tube, wherein said motor control means is configured to activate the drive motor causing the lance tube to be extended into the combustion device upon receiving a start signal, and reverse the drive motor causing the lance tube to be retracted from the combustion device when the magnitude of said sensed drive motor electrical operating parameter reaches a predetermined value.

2. The parameter sensing circuit of claim 1 further comprising:

means for measuring an elapsed time of extension of the lance tube;

window determination means for determining a window of time required to retract the lance tube based on said measured elapsed time of extension; and wherein said motor control means is further configured to turn off the drive motor when the magnitude of said sensed drive motor electrical operating parameter reaches a predetermined value during said window of time required to retract the lance tube.

3. The parameter sensing circuit of claim 2 wherein said time measuring means further comprises a Programmable Logic Controller.

4. The parameter sensing circuit of claim 2 wherein said window determination means further comprises a Programmable Logic Controller.

5. The parameter sensing circuit of claim 1 wherein said means for sensing includes a drive motor current sensor for sensing a drive motor current, wherein said motor control means is configured to retract the lance tube when the magnitude of said sensed drive motor current reaches a predetermined value.

6. The parameter sensing circuit of claim 5 wherein said current sensor further comprises a current sensing relay connected between said Programmable Logic Controller and the drive motor.

7. The parameter sensing circuit of claim 1 wherein said means for sensing includes a drive motor power sensor for sensing a drive motor power, wherein said motor control means is configured to retract the lance tube when the magnitude of said sensed drive motor power reaches a predetermined value.

8. The parameter sensing circuit of claim 7 wherein said power sensor further comprises a power sensing relay connected between said Programmable Logic Controller and the drive motor.

9. The parameter sensing circuit of claim 1 wherein said means for sensing includes a drive motor torque sensor for sensing a drive motor torque, wherein said motor control means is configured to retract the lance tube when the magnitude of said sensed drive motor torque reaches a predetermined value.

10. The parameter sensing circuit of claim 2 wherein said torque sensor further comprises a torque sensing relay connected between said Programmable Logic Controller and the drive motor.

11. The parameter sensing circuit of claim 1 wherein said means for sensing further comprises a Programmable Logic Controller.

12. The parameter sensing circuit of claim 11 wherein said Programmable Logic Controller includes ladder logic programmed for controlling the operation of said Programmable Logic Controller.

13. The parameter sensing circuit of claim 1 wherein said motor control means further comprises a Programmable Logic Controller.

14. A parameter sensing circuit configured for use in a sootblower having a retractable lance tube wherein said lance tube is carried by a carriage into and out of a combustion device, the carriage being driven by a drive motor, the sensing circuit comprising:

means for sensing a drive motor operating parameter;

means for measuring an elapsed time of extension of the lance tube;

window determination means for determining a window of time required to retract the lance tube based on said measured elapsed time of extension; and motor control means for controlling the drive motor during extension and retraction of the lance tube, wherein said motor control means is configured to activate the drive motor causing the lance tube to be extended into the combustion device upon receiving a start signal, reverse the drive motor causing the lance tube to be retracted from the combustion device when the lance tube is being extended and the magnitude of said drive motor operating parameter reaches a predetermined value and turn off the drive motor when the magnitude of said sensed drive motor operating parameter reaches a predetermined value during said window of time required to retract the lance tube.

15. The parameter sensing circuit of claim 14 wherein said means for sensing includes a drive motor current sensor for sensing a drive motor current, wherein said motor control means is configured to retract the lance tube when the lance tube is being extended and the magnitude of said sensed drive motor current reaches a predetermined value and turn off the drive motor when the magnitude of the sensed drive motor current reaches a predetermined value during said window of time required to retract the lance tube.

16. The parameter sensing circuit of claim 14 wherein said means for sensing includes a drive motor power sensor for sensing a drive motor power, wherein said motor control means is configured to retract the lance tube when the lance tube is being extended and the magnitude of said sensed drive motor power reaches a predetermined value and turn off the drive motor when the magnitude of said sensed drive motor power reaches a predetermined value during said window of time required to retract the lance tube.

17. The parameter sensing circuit of claim 14 wherein said means for sensing includes a drive motor torque sensor for sensing a drive motor torque, wherein said motor control means is configured to retract the lance tube when the lance tube is being extended and the magnitude of said sensed drive motor torque reaches a predetermined value and turn off the drive motor when the magnitude of the sensed drive motor torque reaches a predetermined value during said window of time required to retract the lance tube.

18. A method for controlling the extension and retraction of a retractable lance tube in a sootblower wherein said lance tube is carried by a carriage into and out of a combustion device, the carriage driven by a drive motor, said method comprising the steps of:

extending the lance tube into the sootblower;

monitoring a drive motor electrical parameter during said lance tube extension; and reversing said drive motor when the magnitude of said drive motor electrical parameter reaches a predetermined value indicating said lance tube has hit a hard stop.

19. The method of claim 18 wherein said step of monitoring comprises monitoring the drive motor current and the step of reversing comprises reversing the drive motor when the magnitude of said drive motor current reaches a predetermined value.

20. The method of claim 18 wherein said step of monitoring comprises monitoring the drive motor power and the step of reversing comprises reversing the drive motor when the magnitude of said drive motor power reaches a predetermined value.

21. The method of claim 18 wherein said step of monitoring comprises monitoring the drive motor torque and the step of reversing comprises reversing the drive motor when the magnitude of said drive motor torque reaches a predetermined value.

22. The method of claim 18 further comprising the steps of:

measuring an elapsed extension time needed to extend the lance tube into the sootblower;

determining a return time window in which the lance tube is expected to be retracted based on said measured extension time;

sensing a drive motor parameter during said return time window;

stopping the drive motor when the magnitude of said sensed drive motor parameter reaches a predetermined value during said return time window.

23. The method of claim 18 further comprising the steps of:

monitoring a local reverse control during said lance tube extension; and reversing said drive motor when said local reverse control is triggered indicating a manual lance tube reverse request.

* * * * *